United States Patent [19]
Wakiya et al.

[11] Patent Number: 4,813,335
[45] Date of Patent: Mar. 21, 1989

[54] HYDRAULIC ACTUATOR FOR AUTOMOBILES
[75] Inventors: Michio Wakiya; Hiromi Kono, both of Higashi-Matsuyama, Japan
[73] Assignee: Diesel Kiki Co., Ltd., Tokyo, Japan
[21] Appl. No.: 66,250
[22] Filed: Jun. 25, 1987
[30] Foreign Application Priority Data Jul. 1, 1986 [JP] Japan ................................ 61-154338

[51] Int. Cl.⁴ ............................................ F15B 13/16
[52] U.S. Cl. ...................................... 91/361; 91/459; 91/462
[58] Field of Search .................. 91/459, 361, 367, 462; 60/911

[56] References Cited
U.S. PATENT DOCUMENTS 3,768,375 10/1973 Flaschar et al. ...................... 91/459
3,865,218 2/1975 Jones .................................. 91/459 X
3,911,677 10/1975 Collins ............................... 60/911 X
4,499,756 2/1985 Medeiros et al. .................. 60/660 X
4,587,883 5/1986 Ehrentraut et al. ............... 91/361 X
4,595,979 6/1986 Arai et al. ......................... 91/361 X

FOREIGN PATENT DOCUMENTS 86601 5/1982 Japan ..................................... 91/361

Primary Examiner—Edward K. Look
Attorney, Agent, or Firm—Wenderoth, Lind & Ponack

[57] ABSTRACT

A hydraulic actuator for automobiles includes a hydraulic actuator body composed of a hydraulic cylinder and a plurality of solenoid valves, and an electric control circuit disposed adjacent to the hydraulic actuator body for controlling the operation of the solenoid valves. The electric control circuit operates upon receipt of an execution signal, an analog desired-position signal, and an actual-position signal delivered from a position sensor. The hydraulic actuator thus constructed has an improved degree of compatibility.

3 Claims, 2 Drawing Sheets

HYDRAULIC ACTUATOR FOR AUTOMOBILES

BACKGROUND OF THE INVENTION

1. Field of the Invention

The present invention relates to a hydraulic actuator for automobiles for engaging and disengaging an automatic clutch.

2. Prior Art

Automatic clutches are used in automobiles having automatic transmissions. One example of such automatic clutches is disclosed in Japanese Patent Laid-open Publication No. 60-60334. The disclosed automatic clutch is controlled by an hydraulic actuator which includes a plurality of solenoid valves properly operated by control signals from an electric control unit for reciprocating the piston of a hydraulic cylinder to actuate a clutch release lever connected to a piston rod, thereby disengaging and engaging the clutch.

The electric control unit for operating the hydraulic actuator is constituted by a microcomputer which is used also for the control of engine operation. For purposes of safety, the microcomputer is disposed at a suitable position in the passenger compartment. With this placement, extending between the microcomputer and the hydraulic actuator of the automatic clutch which is disposed in an engine room are a number of cables for the passage of driving currents. In addition thereto, cables are necessary for obtaining detecting signals from a position sensor provided for detecting the clutch position. Thus, the prior art system requires a large number of cables extending between the passenger compartment and the engine room for electrically connecting the microcomputer and the hydraulic actuator.

The electric control unit or microcomputer, as described above, is commonly used for the control of engine operation and the control of hydraulic actuator and hence is so programmed as to perform both operation controls. With an increased employment of the hydraulic actuators in view, it is desirable to use the same type of hydraulic actuator in different types of automobiles, however, this requires program modification of electric control unit to suit with the corresponding type of automobile. Accordingly, the corresponding number of types of electric control units are required and the compatible use of the actuators is difficult to achieve. Furthermore, the common use of the electric control unit for controlling several different apparatus would result in overloading of the electric control unit.

SUMMARY OF THE INVENTION

It is therefore an object of the present invention to improve the compatibility of a hydraulic actuator.

Another object of the present invention is to provide an electric control circuit for controlling solenoid valves, which circuit is an analog-control type and hence is relatively inexpensive and is disposed adjacent to a hydraulic actuator body and hence requires a less number of cables.

A further object of the prsent invention is to provide a hydraulic actuator which is easy to carry out troubleshooting and maintenance.

According to the present invention, the foregoing and other objects are attained by a hydraulic actuator for automobiles which comprises a hydraulic actuator body having a hydraulic cylinder and a plurality of solenoid valves for controlling the supply of a working fluid to the hydraulic cylinder, and an electric control circuit disposed adjacent to the hydrauic actuator body and having input terminals for receiving. respectively, an execution signal, an analog desired-position signal and an analog actual-position signal which is delivered from a position sensor, and an analog comparison/computation portion for controllingly actuating desired ones of the solenoid valves.

With this construction, the electric control circuit having the analog comparison/computation portion is disposed adjacent to the hydraulic actuator body and hence requires a less number of cables. Operation of the hydraulic actuator is controlled by the electric control circuit on the basis of computation of the execution signal and the desired-position signal that are delivered from an electric control unit provided for controlling engine opration, and the actual-position signal delivered from the position sensor.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

The present invention is described below in greater details in conjunction with an embodiment taken with reference to the drawings.

Figure 1:
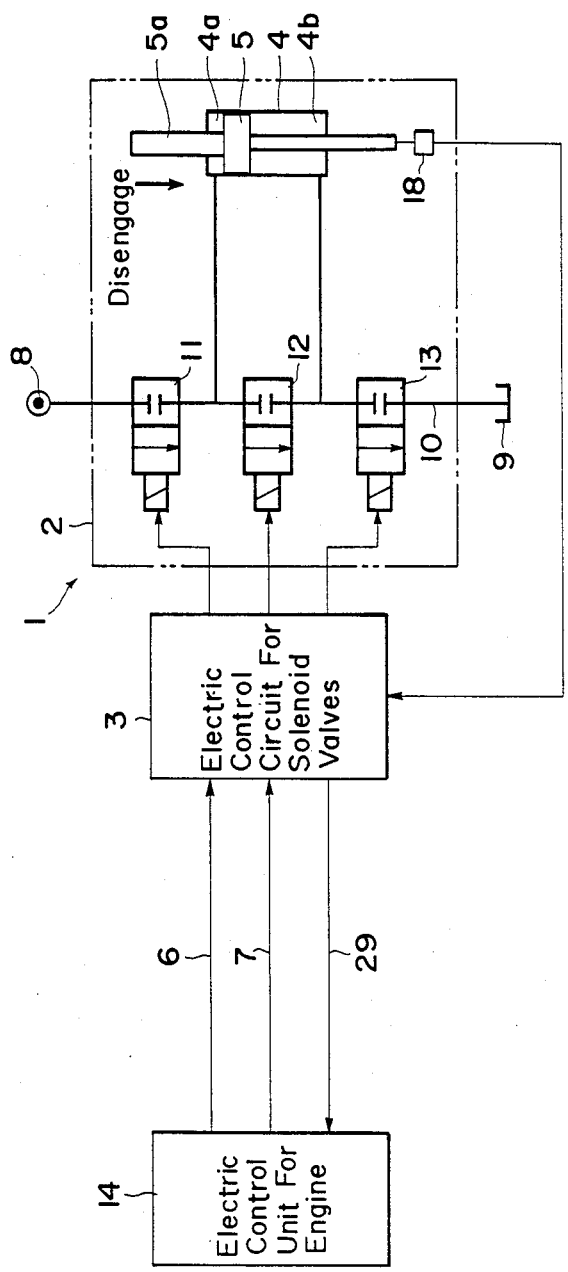
FIG. 1 is a block diagram showing the general construction of a hydraulic actuator according to the present invention.

FIG. 1 shows the general construction of a hydraulic actuator 1 embodying the present invention. The hydraulic actuator 1 includes a hydraulic actuator body 2 and an electric control circuit 3 associated therewith. The hydraulic actuator body 2 is adapted to engage and disengage a clutch (not shown) and, for this purpose, it includes a hydraulic cylinder 4. The hydraulic cylinder 4 comprises a differntial cylinder including a piston 5 opposite end faces of which have different effective surface areas so that the cylinder 4 has a low pressure chamber 4a and a high pressure chmber 4b extending on opposite sides of the piston 5. The chambers 4a, and 4b are connected to a hydraulic circuit, as described below.

The hydraulic circuit includes an oil hydraulic pressure source 8 for sending a working fluid toward a reservoir or oil tank 9 through a line 10 in which a normally closed first solenoid valve 11, a normally closed second solenoid valve 12, and a normally closed third solenoid valve 13 are disposed in the described order as viewed from the upstream side.

The downstream side of the first solenoid valve 11 is connected with the low pressure chamber 4a in the hydraulic cylinder 4, and the downstream side of the second solenoid valve 12 is connected with the high pressure chamber 4b in the hydraulic cylinder 4. Consequently, in response to operation of the first to third solenoid valves 11–13 in a predetermined pattern, the piston 5 of the hydraulic cylinder 4 is reciprocated to engage and disengage the non-illustrated clutch through a piston rod 5a.

The control pattern of the valves 11–13 does not constitute a substantial part of the present invention and therefore a description thereof is not necessary.

The electric control circuit 3 is associated with the hydraulic actuator body 2 to control the opening and closing motions of the solenoid valves 11–13. Though not shown but in practical use, the control circuit 3 is disposed in a suitable control box.

Figure 2:
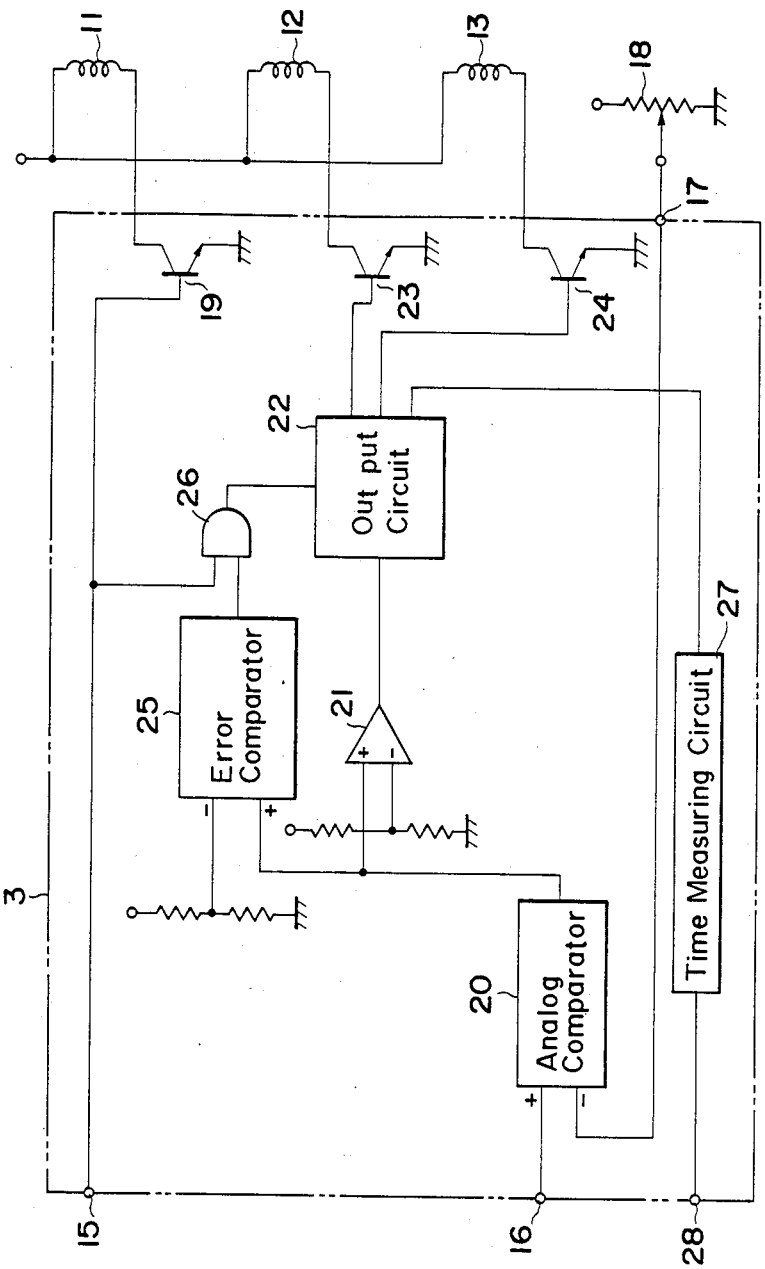
FIG. 2 is an electric circuit diagram of the hydraulic actuator.

The electric control circuit 3 serves to achieve an analog comparison and computation and, as shown in FIG. 2, it includes first and second input terminals 15 and 16 for receiving, respectively, an execution signal and an desired-position signal that are delivered through cables 6, 7 (FIG. 1) from an electric control unit 14 provided for controlling engine operation, and a third input terminal 17 for receiving an actual clutch-position signal delivered from a position sensor 18. The electric control circuit 3 controls operation of the solenoid valves 11–13 on the basis of the input data.

The input terminal 15 for the execution signal is coupled with the first solenoid valve 11 through an output transistor 19 so that the solenoid vlave 11 is actuated to open when an execution signal is inputted to the terminal 15.

The input terminal 16 for the desired-position signal receives an analog voltage signal from the electric control unit 14. The input signal is then delivered to an analog comparator 20 which in turn compares the input singal with an actual-position signal delivered from the position sensor 18. The comparator 20 delivers an analog deviation output signal to a comparator 21 which in turn transfers the deviation output signal to a high or low level signal. The high or low level signal is supplied to an output circuit 22. The output circuit 22 is connected to the second and third solenoid valves 12 and 13 through a pair of output transistors 23 and 24 for selectively actuating the second and third solenoid valves 12 and 13 on the basis of the input signal received from the comparator 21.

The analog output signal of the analog comparator 20 is also inputted to an error comparator 25 in which a comparison is made to determine whether or not the position of the piston rod 5a of the hydraulic cylinder 4 is located within a predetermined tolerance range. If the position of the piston rod 5a is in the tolerance range, then the output of the comparator 25 will be high level and, in other cases the output level is low. The output of the error comparator 25 and the output of the execution signal are delivered to an AND gate circuit 26. When the execution signal and the output singal from the error comparator 25 occur simultaneously (i.e. the position of the piston rod is located within the tolerance range), the AND circuit 26 issues an inhibition signal to the output circuit 22 to thereby block the output from the output circuit 22. Consequently, the second and third solenoid valves 12 and 13 are kept closed with the result that the piston rod 5a is kept immovable or locked in the present position.

The output circuit 22 is associated with a circuit for monitoring the output signal from the output circuit 22 to detect a trouble or fault of the electric control circuit 3. The trouble detecting circuit includes a time measuring circuit 27 connected to the output circuit 22 and also to a terminal 28 and delivers an output signal indicative of the detected trouble from the terminal 28 through a cable 29 to the electric control unit 14 when the output signal from the output circuit 22 continues after the expiration of a predetermined period of time.

With the hydraulic actuator thus constructed, when the gear position of an automatic transmission is to be changed or shifted while an engine is operating, the automatic clutch is actuated. To this end, an execution signal and a desired-position signal are sent from the electric control unit 14 respectively through the cables 6 and 7 to the input terminals 15 and 16. Upon delivery of the execution signal, the first solenoid valve 11 is actuated so as to open. The desired-position signal is delivered to the analog comparator 20 in which the desired-position signal is compared with an actual-position signal delivered from the position sonsor 18 as an indicia of the position of the piston rod 5a. The comparator 20 then delivers an analog deviation output signal to the comparator 21 which in turn converts the deviation output signal to a high or low level signal. Depending on the signal level thus obtained, the second and third solenoid valves 12 and 13 are actuated to alternately open and close. That is, when the second solenoid valve 12 is open while the third solenoid valve 13 is closed, the piston rod 5a is moved toward its fully extended position for engaging the clutch. On the other hand, when the second solenoid valve 12 is closed while the third solenoid valve 13 is open, the piston rod 5a is moved toward its fully retracted position to disengage the clutch.

When the deviation between the actual-position signal from the position sensor 18 and the desired-position signal comes within a predetermined tolerance range, the output from the error comparator 22 becomes high. Consequently, the AND gate circuit 26 issues an inhibition signal to the output circuit 22 to block the output from the output circuit 22. The second and third solenoid valves 12 and 13 are therefore de-energized to return their normal closed positions with the result that the cylinder rod 5a of the hydraulic cylinder 4 is locked in the present position.

Obviously, many modifications and variations of the present invention are possible in the light of the above teachings. It is therefore to be understood that within the scope of the appended claims, the invention may be practiced otherwise than as specifically described.

What is claimed is:

1. A hydraulic actuator for automobiles, comprising:
   (a) a hydraulic actuator body having a hydraulic cylinder and a plurality of solenoid valves for controlling the supply of a working fluid to said hydraulic cylinder;
   (b) an electric control circuit disposed adjacent to said hydraulic actuator body and having input terminals for respectively receiving an execution signal and an analog desired-position signal from another electric control circuit disposed away from said actuator body and for receiving an analog actual-position signal which is delivered from a position sensor, an analog comparison/computation portion for controllingly actuating desired ones of said solenoid valves based on said execution signal, said analog desired-position signal and said analog actual-position signal, and a time measuring circuit for detecting a trouble and issuing a trouble-detecting signal when said comparison/computation portion continuously issues drive signals to said desired solenoid valves after the expiration of a predetermined period of time.

2. A hydraulic actuator according to claim 1, said comparison/computation portion comprising a comparator for comparing the desired-position signal with the actual-position signal from said position sensor, and an output circuit for delivering an output driving signals to selected ones of said solenoid valves depending on the result of comparation in said comparator.

3. A hydraulic actuator according to claim 2, said comparison/computation portion including an inhibiting circuit for inhibiting the actuation of said solenoid valves by said output circuit when the result of comparison of said comparator comes within a predetermined range.

* * * * *